United States Patent [19]
Roecker et al.

[11] Patent Number: 5,640,301
[45] Date of Patent: Jun. 17, 1997

[54] SYSTEM FOR ADAPTING A PERSONAL COMPUTER FOR RADIO COMMUNICATION

[75] Inventors: David W. Roecker; James E. Keen, both of Denver; Richard W. Morris, Bloomfield, all of Colo.

[73] Assignee: CliniCom Incorporated, Boulder, Colo.

[21] Appl. No.: 233,055

[22] Filed: Apr. 26, 1994

Related U.S. Application Data

[63] Continuation-in-part of Ser. No. 990,568, Dec. 15, 1992, Pat. No. 5,307,372, which is a continuation-in-part of Ser. No. 652,976, Feb. 8, 1991, Pat. No. 5,179,569, which is a continuation-in-part of Ser. No. 343,602, Apr. 25, 1989, abandoned, which is a division of Ser. No. 78,195, Jul. 24, 1987, Pat. No. 4,835,372, which is a continuation-in-part of Ser. No. 862,278, May 12, 1986, abandoned, which is a continuation-in-part of Ser. No. 757,277, Jul. 19, 1985, abandoned.

[51] Int. Cl.$^6$ ............................... G06F 1/16; H05K 7/10
[52] U.S. Cl. ............................... 361/686; 248/551
[58] Field of Search ............................... 364/708.1; 70/58, 70/279; 248/551, 553; 361/680–686; 439/928, 929

[56] References Cited

U.S. PATENT DOCUMENTS

| | | |
|---|---|---|
| 2,864,943 | 12/1958 | Schultz . |
| 3,949,397 | 4/1976 | Wagner et al. . |
| 4,042,906 | 8/1977 | Ezell . |
| 4,345,147 | 8/1982 | Aaron et al. ............ 361/686 X |
| 4,724,435 | 2/1988 | Moses et al. . |
| 4,850,009 | 7/1989 | Zook et al. . |
| 5,052,943 | 10/1991 | Davis ............ 439/929 X |
| 5,202,817 | 4/1993 | Koenck et al. ............ 361/680 |
| 5,313,053 | 5/1994 | Koenck et al. ............ 235/472 |

FOREIGN PATENT DOCUMENTS

93/01540  1/1993  WIPO ............ G06F 1/16

Primary Examiner—Michael W. Phillips
Attorney, Agent, or Firm—Beaton & Folsom, P.C.

[57] ABSTRACT

A system (10) for providing radio communication of data between a central processing computer (18) having a first transceiver (20) electrically connected thereto and a remotely located hand held personal computer (12). The personal computer includes an input and output device (28) mounted to the housing to allow interaction by a user. A second transceiver (102) is provided in a transceiver/handle housing (16). The transceiver/handle housing (16) is configured to be grasped by a single hand of a user. A spacing bracket (126) joins the second housing to the housing of the personal computer. An electrical connection provides for electric communication between the personal computer (12) and the second transceiver (102) so that data can be transmitted between the central processing computer (18) and the personal computer (12) by the first and second transceivers.

17 Claims, 4 Drawing Sheets

SYSTEM FOR ADAPTING A PERSONAL COMPUTER FOR RADIO COMMUNICATION

This is a continuation-in-part of Ser. No. 990,568 filed Dec. 15, 1992, which issued as U.S. Pat. No. 5,307,372, which is a continuation-in-part of Ser. No. 652,976 filed Feb. 8, 1991, which issued as U.S. Pat. No. 5,179,569, which is a continuation-in-part of Ser. No. 343,602, filed Apr. 25, 1989, abandoned, which is a divisional of Ser. No. 78,195, filed Jul. 24, 1987, which issued as U.S. Pat. No. 4,835,372, which is a continuation-in-part of Ser. No. 862,278, filed May 12, 1986, now abandoned, which is continuation-in-part of Ser. No. 757,277, filed Jul. 19, 1985, now abandoned.

BACKGROUND OF THE INVENTION

1. Technical Field

The present invention is directed toward a radio communication system, and more particularly toward a system for adapting a personal computer into a radio communications system for transmission of data among a base unit and the personal computer.

2. Background Art

Medical institutions are faced with a competitive environment in which they must improve profitability yet simultaneously improve patient care. There are several factors which contribute to the ever increasing costs of hospital care. For example, there is an ever increasing amount of paper work required by nurses, pharmacists and laboratory personnel. In addition, inaccurate recordings of drugs, supplies and tests involved in patient care result in decreasing revenues by a failure to fully capture billing opportunities of these actual costs. Inadequate management also results in a failure accurately report of all costs involved in treating a particular illness. The lack of accurate and rapid transfer of patient information often reduces the accuracy or effectiveness of drug administration in patient care, thereby increasing the duration of a hospital stay.

In addition, hospitals and other institutions must continuously strive to provide quality patient care. Medical errors, where the wrong patient receives the wrong drug at the wrong time, in the wrong dosage, or even the wrong surgery, are a significant problem for all health care facilities. Many prescription drugs and injections are identified merely by slips of paper on which the patient's name and identification number have been hand written by a nurse or technician who is to administer the treatment. For a variety of reasons, such as the transfer of patients to different beds and errors in marking the slips of paper, the patient, may be given an incorrect treatment. Further, as health care facilities continue to decrease the number of staff personnel as a cost cutting measure, the possibility of personnel errors will most likely increase.

Some of these problems have been addressed in Zook, U.S. Pat. No. 4,850,009 assigned to the assignee of the present invention. The Zook patent describes a portable hand held terminal which includes a data entry keyboard, a data entry optical bar code reader and an RF transceiver. The bar code reader and the keyboard can be used to enter data regarding the patient identity, the type of drug to be administered, or other information. The information is transmitted to a base transceiver which modulates the information and electronically communicates with a central recordation means such as a processing unit or CPU. The base transceiver can transmit verifications or other limited information from the CPU back to the portable hand held terminal. A set of terminals can also be in hard wire electronic communication with the CPU to enter in display data such as billing information. While the system described in the Zook patent is very effective, it is limited in that it is not intended to incorporate as a portable hand held terminal an off the shelf computer. Zook contemplates a portable hand held terminal specifically constructed for use as a remote communication unit.

New developments in computer technology, particularly in the personal computer format, continue to be made at an ever increasing rate. For example, ever more powerful microprocessors are being introduced every one to two years. In addition, new and improved data entry formats are being developed as data processing power increases. For example, pen based computers are now available which are able to recognize characters drawn on a screen with an activating wand or "pen". With this ever increasing rate of development in the personal computing area, particularly with respect to pen based computers, some means of incorporating state of the art computers into a radio communication system without significant modification of the computer is desirable. Heretofore, the prior art has failed to address this need.

Present clinical environments are filled with a variety of medical instruments which can clutter a work area or patient's room, thus interfering with safe and efficient patient care. In addition, this mass of medical equipment results in a tangle of wires necessary for powering the medical equipment and for communication among the medical equipment. Thus, while there is clearly a great need for portable hand held terminals for wireless communication with a central processing unit, there is an overriding need that such terminals not add to the crowding and potential for confusion in the clinical environment.

A growing problem confronting health care providers is loss or theft of costly medical equipment. Hospitals are often public or quasi public facilities, making it difficult to protect medical equipment, particularly small devices which can be readily hand carried. Thus, a need exists for providing security for personal computers used as portable hand held terminals.

The present invention is directed toward overcoming one or more of the problems discussed above.

SUMMARY OF THE INVENTION

The present invention is a system for providing radio communication of data between a central processing computer having a first transceiver electrically connected thereto and a remote user interface. The system includes a user interface remote from the central processing computer, the user interface including a housing and an input and output device mounted to the housing to allow interaction by a user. A second transceiver is provided in a second housing which defines a receptacle for receiving the second transceiver. The housing is configured to be grasped by a single hand of the user. An electrical connection provides for electronic communication between the user interface and the second transceiver so that data can be transmitted between the central processing computer and the remote user interface by the first and second transceivers. A mount attaches the second housing to the user interface housing, the second housing being mounted to the user interface housing so that a user may grasp the second housing with one hand and access the input and output device with the other hand.

Preferably, the transceiver housing is a rigid casing having a handle pivotally mounted thereto. A lengthwise slot is provided in the rigid casing for receiving the handle when the handle is pivoted onto the rigid casing.

Another aspect of the system is an attachment for mounting the user interface to a fixture. The attachment includes a base plate attachable to a vertical surface. A carrier plate is joined to the base plate by two pairs of parallel legs, including a first pair of parallel legs pivotably mounted to the carrier plate and the base plate, and a second pair of parallel legs pivotably mounted to the base plate and the carrier plate below the first pair of legs, the second pair of legs being longer than the first pair of legs. In this manner, as the carrier plate is pulled from the base plate, the carrier plate inclines relative to the base plate so as to facilitate easy access to the input and output means of a user interface mounted to the carrier plate.

Another aspect of the system is a structure for mounting the user interface to the carrier plate. The structure includes a spacing bracket attached between the computer housing and second housing, the spacing bracket having a leading edge. The leading edge of the spacing bracket slides into engagement with an engaging edge of the carrier plate, there being interlocking teeth between the leading edge of the spacing bracket and the engaging edge of the carrier plate.

Yet another aspect of the system is providing a lock on the carrier plate for securing a user interface to the carrier plate. The lock is movable between a first position preventing disengagement of the user interface and a second position allowing disengagement of the user interface. An actuator responsive to an electric signal moves the lock between the first and second positions. The actuator is in electrical communication with the user interface. The user interface generates an electric signal causing the actuator to moves the lock between the first and second positions upon entry by a user of a select code into the input/output means of the user interface.

The system described by the present invention enables any personal computer to be quickly and easily modified into a remote unit for wireless communication with a central computer. The handle which houses the transceiver for the personal computer facilitates ease of handling of the personal computer by a user during entry of data and further provides a convenient incline to the personal computer when the personal computer resides on a table top. The wall mount provides a convenient storage location for the personal computer which minimizes cluttering of the clinical environment within which the remote personal computer is used. The wall mount also provides a convenient incline to the personal computer during entry of data by a user. Furthermore, the wall mount provides security for the personal computer thereby minimizing risk of loss or theft of the personal computer. In addition, the sliding connection between the personal computer and the wall mount facilitates ease of engaging the personal computer to the wall mount, thereby increasing the likelihood that a user will replace the personal computer in the wall mount as opposed to setting it on a table or some other unsecured location. The charger located in the wall mount and the electrical communication provided between the wall mount and the chargeable battery of the personal computer by the inventive system conveniently provides for recharging of the personal computer batteries without the necessity of wires which would further clutter the clinical environment.

DETAILED DESCRIPTION OF THE PREFERRED EMBODIMENT

Figure 1:
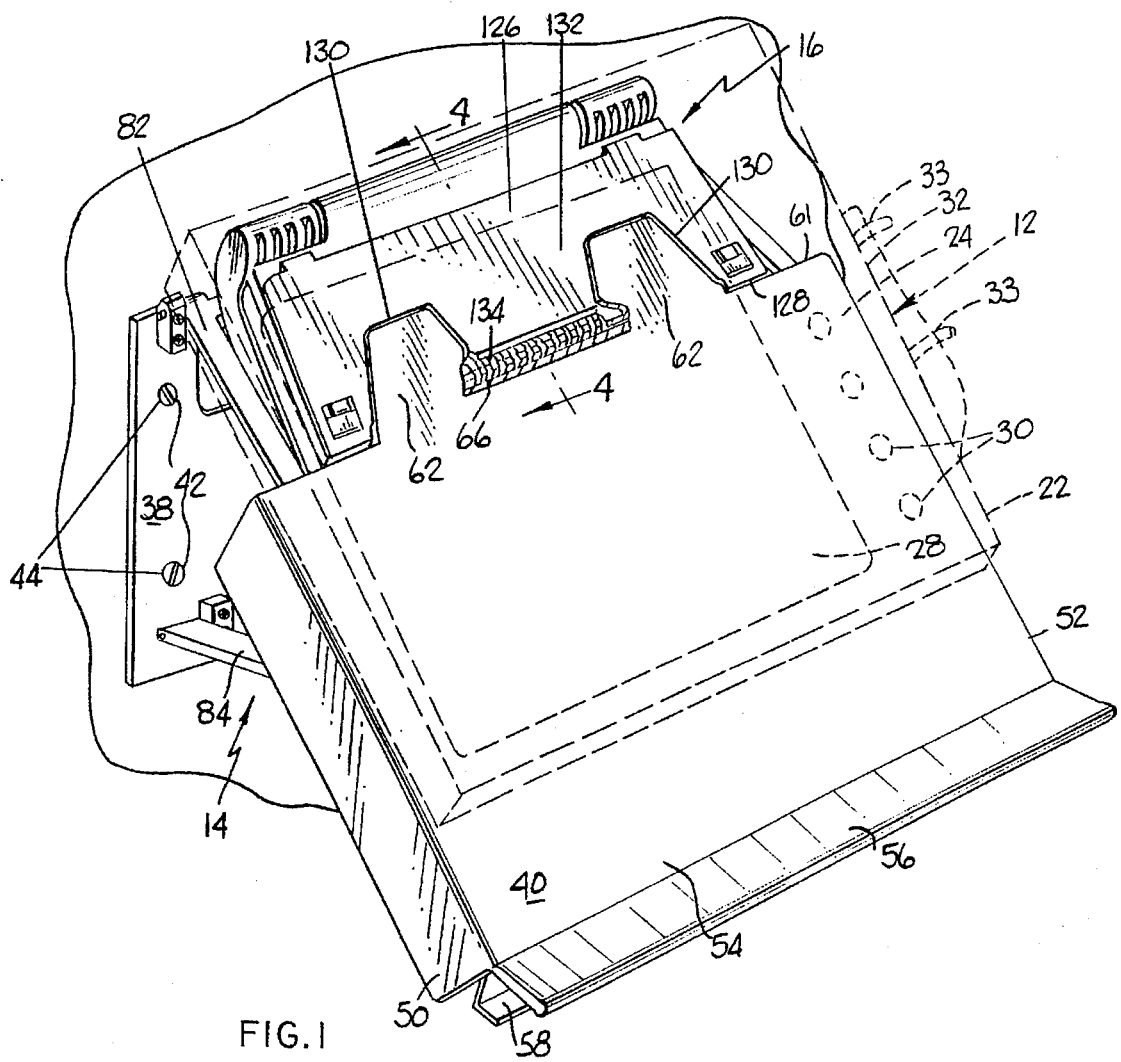
FIG. 1 is a perspective view of the system for adapting a personal computer for radio communication of the present invention.
Figure 9:
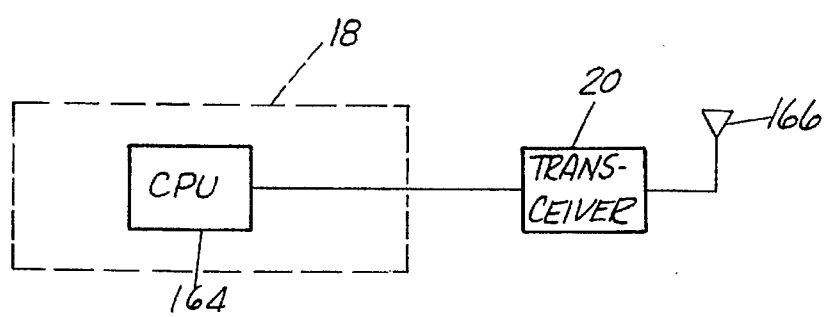
FIG. 9 is a representational diagram of the proposed electronic elements of the central processing computer.

FIG. 1 illustrates the system (10) for adapting a personal computer for radio communication. The system (10) includes a user interface on personal computer (12), a wall mount (14) and a transceiver/handle housing (16). Also included in the system (10) and illustrated in FIG. 9 is a central processing computer (18) in electrical communication with a transceiver (20).

Figure 2:
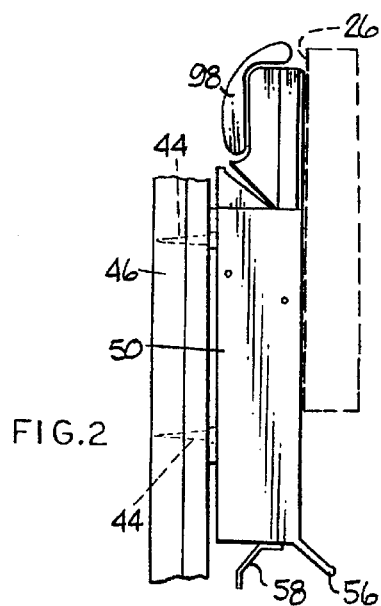
FIG. 2 is a left side elevation view of the system of FIG. 1 with the carrier plate in a vertical storage position.
Figure 3:
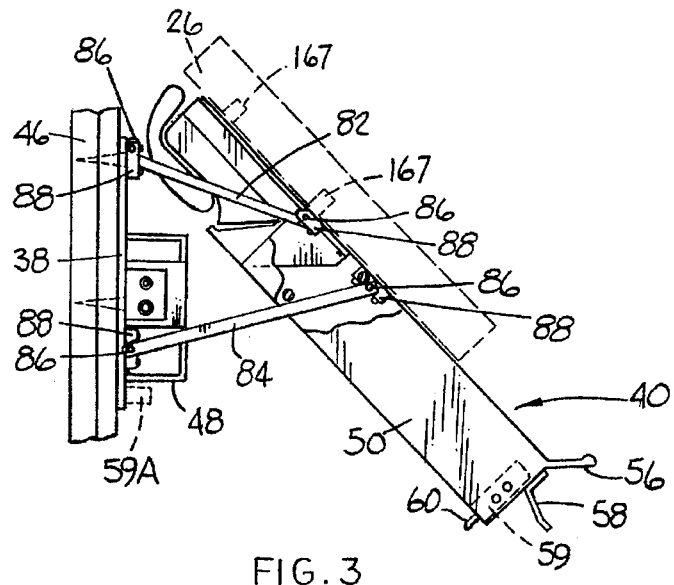
FIG. 3 is a left side elevation view of the system of FIG. 1 with the side wall of the carrier plate partially broken away.

The personal computer is preferably a pen based PC and includes a housing (22) having a front surface (24) and a back surface (24) (see FIGS. 2 and 3). The front surface (24) includes a touch screen (28) and a plurality of controls (30). As readily appreciated by those skilled in the art, the touch screen (28) provides an input and output device for a user to interface with the pen based PC (12). The controls (30) include, for example, screen contrast controls, on/off control, screen brightness, etc. An activating wand or pen (32) is attached to the PC housing (22) by clips (33). The pen (32) is usable for drawing characters on the touch screen (28) or for selecting icons displayed on the screen.

The wall mount (14) includes base plate (38) and a carrier plate (40). The base plate (38) has a plurality of holes (42) which receive screws (44) for attaching the base plate to a vertical surface such as a wall (46) (see FIG. 2). Attached to the base plate (38) is a recharger housing (48) (see FIG. 3).

Figure 4:
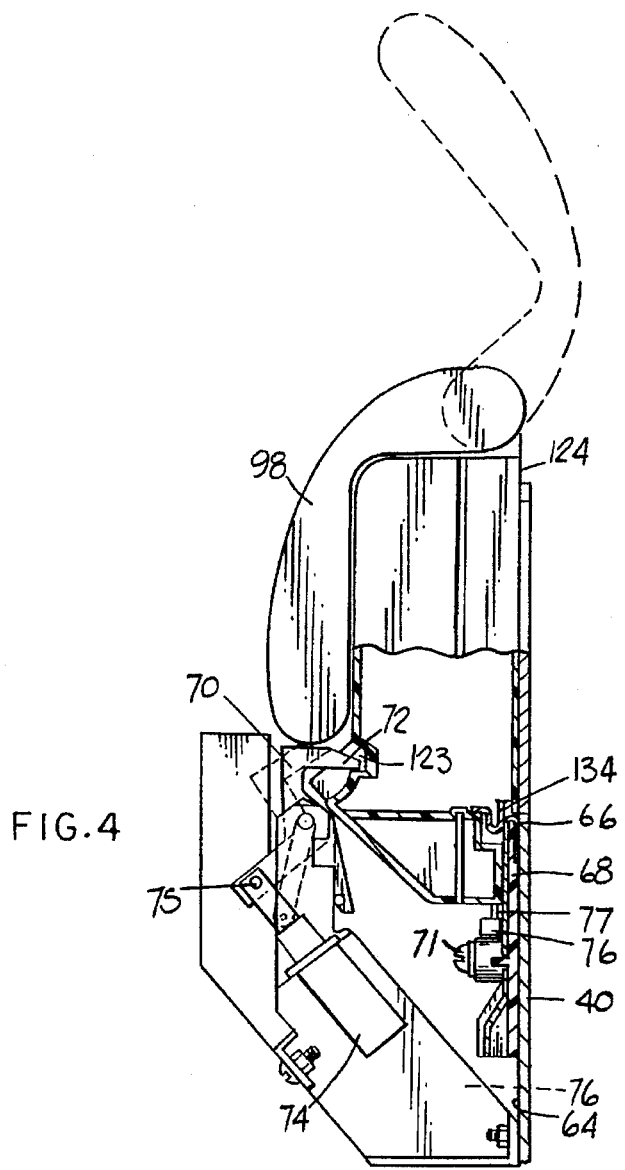
FIG. 4 is a sectional view of the locking mechanism taken along line 4—4 of FIG. 1.

The carrier plate (40) has first and second side walls (50,52) facing rearwardly from a front surface (54) of the carrier plate (40). At the base of the carrier plate (40) is an inclined lip (56). Pivotably attached between the side walls (50,52) and residing underneath the inclined lip (56) is a release bar (58). As best viewed in FIG. 3, a first portion of a release mechanism (59) is attached to the release bar (58). A release pin (60) extends from the first portion of the release mechanism for engagement with a second portion of the release mechanism (59A) residing on the base plate (38). As the release bar (58) is pulled by a user toward the lip (56), the first portion of the release mechanism (59) moves the pin (60) out of engagement with the second portion of the release mechanism (59A), freeing the carrier plate (40) to incline relative to the base plate (38) as described below. At the upper or engaging edge (61) of the carrier plate (40) are a pair of spaced teeth (62). As seen in FIG. 4, attached to the back surface (64) of the carrier plate (40) are a plurality of electrical contacts (66) (see also FIG. 1) spaced from the back surface (64) of the carrier plate by an insulator (68) and maintained in place by a screw (71). As also seen in FIG. 4, a latch (70) having an engaging tooth (72) is pivotably mounted to the back surface (64) of the carrier plate (40). A solenoid (74) is pivotably connected to the latch (70) by a pin (75). Actuation of the solenoid (74) functions to pivot the latch (70) from an engaging position illustrated in solid lines in FIG. 4 and a disengaging position in illustrated in phantom lines in FIG. 4, as will be discussed in greater detail below Also attached to the back surface (64) of the carrier plate (40) is a microswitch (76) having a plunger (77) for engaging the transceiver/handle housing (16). The microswitch (76) controls current flow to the electric contacts (66).

Two pairs of parallel spaced apart legs (82,84) extend between the base plate (38) and the back surface (64) of the carrier plate (40). Each pair of legs is joined by an integral cross-bar (not shown). As best seen in FIG. 3, the first and second pairs of parallel spaced apart legs (82,84) are pivotably connected to each of the base plate (38) and the back surface of the carrier plate (64) by pins (86) extending through nylon bearings (88). Friction between the pivot pins (86) and the nylon bearings (88) resist free pivoting of the first and second pairs of legs (82,84) under the force of gravity so that as the carrier plate (40) is inclined from the face plate (38), it will maintain its inclined position against the force of gravity until forcibly repositioned by a user. As seen in FIGS. 1 and 3, the first pair of spaced apart legs (82) is located above the second pair of spaced apart legs (84) and is shorter than the second pair of spaced apart legs (84). Thus, when a user grasps the release bar (58) and draws it toward the inclined lip (56) releasing the release mechanism (59, 59A) to allow movement of the carrier plate (40) relative to the base plate (38), the carrier plate (40) is inclined relative to the base plate (38) as the inclined lip (56) is drawn away from the base plate (38).

Figure 5:
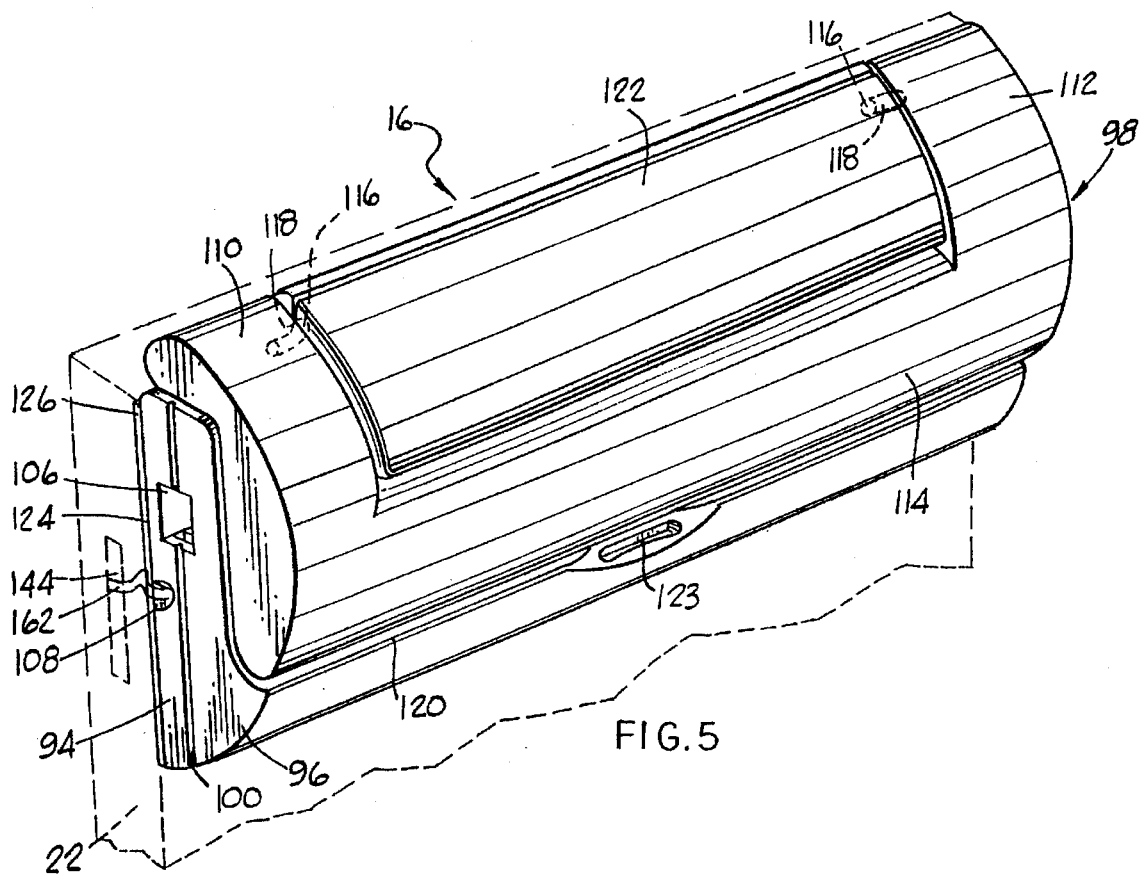
FIG. 5 is a perspective view of the transceiver/handle housing of the system of FIG. 1.

The transceiver/handle housing (16) is best seen in FIG. 5. The housing (16) consists of three molded plastic pieces: a back housing portion (94), a front housing portion (96) and a handle (98). The back housing portion (94) and the front housing portion (96) are joined by engaging lips (100) to form a cavity for receiving a transceiver (102) and an antenna (104) shown schematically in FIG. 8. A bar code connecting slot (106) is formed between the front and back housing portions (94,96). A connector cable slot (108) is formed in the back housing (94). The handle (98) includes first and second parallel legs (110,112) joined by a transverse grip (114). The first and second legs (110,112) are pivotably mounted to the housing (16) by pins (116) which extend inwardly from each of the first and second legs (110,112) receiving holes (118) formed between the housing portions (94,96). With the handle (98) pivoted onto the front housing portion (96) as illustrated in FIG. 5, the transverse grip (114) is received in a groove (120) which extends lengthwise of the front housing portion (96). A land portion (122) occupies the space between the first and second legs (110,112) with the handle (98) pivoted onto the front housing portion. As seen in FIGS. 4 and 5, the cross-section of the transceiver/handle housing is semi-circular with the handle (98) received in the groove (120). At the edge of the groove (120) is a notch (123) configured to receive the engaging tooth (72) of the latch (70) as seen in FIG. 4 and as will be discussed in greater detail below.

The back housing portion (94) has a flat back (124) to which is attached a spacing bracket (126). As best viewed in FIG. 1, the spacing bracket (126) has a leading edge (128) with a pair of gaps (130) therein, with a tooth (132) between the gaps. The gaps (130) and the tooth (132) are configured to receive the teeth (62) of the carrier plate (40).

Referring to FIG. 4, at the bottom of the flat back (124) of the back housing portion are a plurality of electrical contacts (134) positioned and configured to engage the electrical contacts (66) extending from the back surface of the carrier plate (40) to form an electrical connection therebetween.

Figure 6:
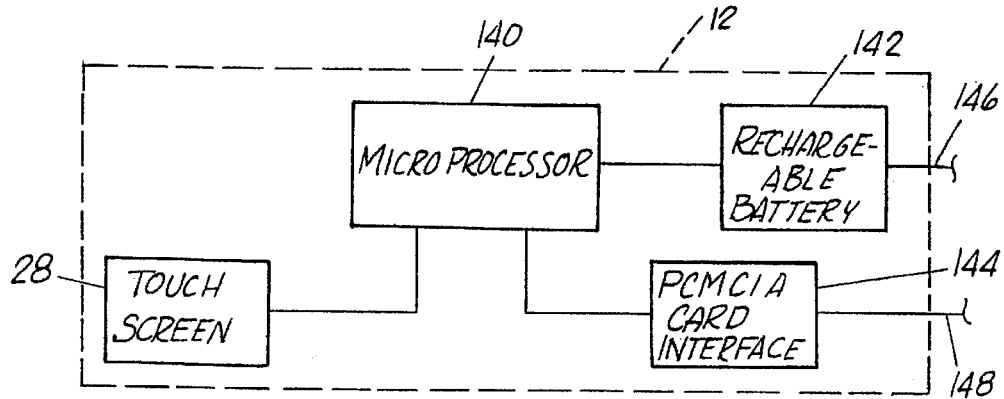
FIG. 6 is a representational diagram of the principle electronic elements of the personal computer of the system.

The principle electronic components of the pen-based PC (12) are shown schematically in FIG. 6. A microprocessor (140) is electrically connected to a rechargeable battery (142), a PCMCIA card interface (144) and the touch screen (28). The connection (146) extends from the PC (12) for electrical communication between the rechargeable battery (142) and a battery recharger. Also, an electric connection (148) extends from the PCMCIA card interface (144) to allow input and output of data through the PCMCIA card interface (144).

Figure 7:
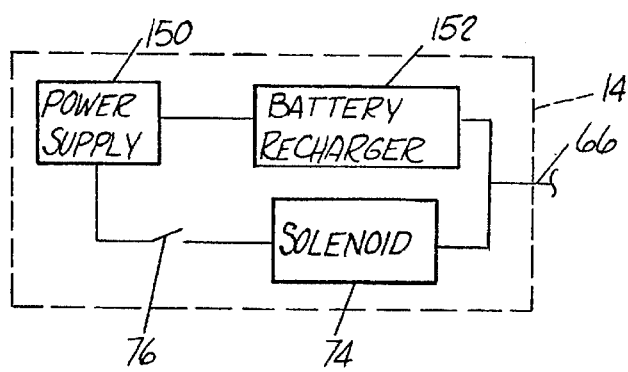
FIG. 7 is a representational diagram of the principle electronic elements of the wall mount unit of the system.

The electric components of the wall mount (14) are shown schematically in FIG. 7. A power supply (150) such as a connection to an electric outlet is connected with a battery recharger (152) and the solenoid (74). The battery charger (152) and the solenoid (74) are electrically connected with the electrical contacts (66) shown schematically in FIG. 7. The microswitch (76) controls current flow through the wall unit components as described below.

Figure 8:
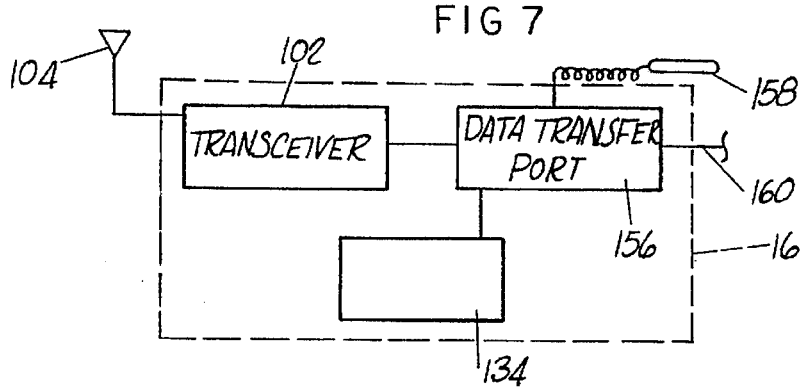
FIG. 8 is a representation diagram of the principle electronic elements of the transceiver/handle housing of the system.

FIG. 8 is a schematic representation of the electronic components of the transceiver/handle housing (16). The transceiver (102) is electrically connected to the antenna (104). The transceiver (102) is also electrically connected with a data transfer port (156) having a bar code reader (158) hard wired thereto. The data transfer port (156) is also provided with an electrical connector (160) which is joined by a connector cable (162) (see FIG. 5) to the electrical connection (148) to the PCMCIA card interface (144) so as to provide electrical communication between the data transfer port (156) and the PCMCIA card interface (144). Also included in the transceiver/handle housing electronics are the electrical contacts (134) shown schematically in FIG. 8. The electrical contacts (134) provide an electric interface between the microprocessor (140) and the solenoid (74) so that the solenoid (74) can be actuated by an electric signal generated by the microprocessor (140) as will be discussed further below. In addition, the electrical contacts (134) provide a path for electricity between the battery recharger (152) of the wall mount (14) and a rechargeable battery (142) of the PC (12).

FIG. 9 illustrates the principle electrical components of the central processing computer (18). These include the central processing unit (164) in electrical communication with the transceiver (20). The transceiver (20) is in turn in electrical communication with the antenna (166).

The system for adapting a personal computer for radio communication (10) is assembled as follows. The transceiver/housing (116) is attached to the top of the back surface (26) of the PC housing (22) handle (98) proximate the top of housing (22). More particularly, the spacing bracket (126) is fastened directly to the back surface (26) of the housing (22). In a preferred form, threaded inserts (167) are provided in the back surface (26) of the PC housing for receiving screws to attach the spacing brackets (126). Alternatively, a curable adhesive can be used to attach the spacing bracket (126).

Figure 10:
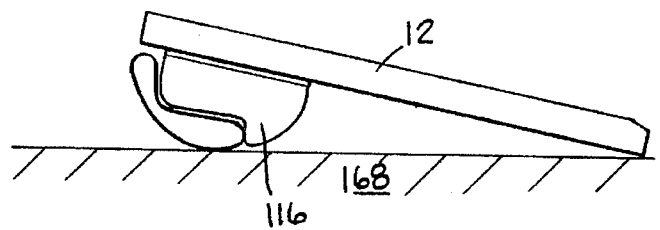
FIG. 10 illustrates a personal computer with the transceiver/handle housing attached resting on a table.

The transceiver/handle housing (16) is configured so that when it is attached to the PC (12) discussed above, the PC and handle rest upon a table top (168) with the PC (12) slightly inclined in a user friendly manner, as illustrated in FIG. 10.

Attachment of the pen-based PC (12) with the transceiver/handle housing (16) attached thereto to the wall mount (14) is best understood with reference to FIG. 1. The user rests the back surface (26) of the PC housing (22) on the front surface (54) of the carrier plate (40) and then slides the PC (12) downward toward the inclined lip (56). The transceiver/handle housing (16) is received between the first pair of spaced apart legs (82) as the PC housing (22) is slid downward and the teeth (62) of the carrier plate (40) are received in the gap (130) in the leading edge (128) of the spacing bracket (126). In this manner, lateral movement of the PC relative to the carrier plate (40) is prevented. As the teeth (62,132) become nested, the engaging tooth (72) of the latch (70) is received in the notch (123) in front housing portion (96) of the transceiver/handle housing (16). In this manner removal of the PC from the wall mount is prevented. The PC can thus be securely stored in an out of the way place within a clinical setting.

With the spacing bracket (126) engaged by the carrier plate (40), the housing (16) abuts the plunger (77) of the microswitch (76) and the carrier circuit is closed and electricity from the charger (152) can flow to the contacts (66). The carrier plate electric contacts (66) in turn engage the handle electric contacts (134) as illustrated in FIG. 4. In this manner the battery recharger (152) makes electrical contact with the rechargeable battery (142) of the PC (12) through the connector cable (162). Thus, upon placement of the PC into the wall mount recharging of the rechargeable battery (142) is automatic and begins instantaneously. This feature also allows the PC to be used even while the batteries are recharging.

Should a clinician desire to remove the PC from the wall mount, the wall mount should be pivoted to its vertical storage position illustrated in FIG. 2. The user then enters a select code which causes the microprocessor (140) to send a signal to the solenoid (74) through the electric contacts (66,134) causing the solenoid (74) to move the latch (70) from its engaging position to the disengaging position shown in phantom lines in FIG. 4. The user can then pivot the handle upward as seen in FIG. 3 and slidably remove the PC and the attached transceiver/handle housing (16) from the wall mount (14) by pulling upward. This opens the microswitch (76), cutting off current to the contacts (66). A user carrying the PC (12) may then use the handle (98). When the user wishes to enter data into the PC using the touch screen (28) and pen (32), the user can conveniently rest the PC on his forearm while grasping the transceiver/handle housing (16). The user's grip can be further secured by pivoting the handle (98) away from the housing (16) so that user can extend his hand through the space between the lags (110,112) and wrap his fingers around the land portion (122). Thus, the transceiver/handle housing both facilitates data entry into the PC and provides for more secure handling of the PC.

Transmission and receipt of data via the transceivers (102,20) is more fully described in Sawyer, U.S. Pat. No. 5,179,569, which is incorporated by reference herein. The present point of emphasis is that the transceiver/handle housing permits ready conversion of any personal computer into a remote communication unit for a data entry and retrieval system. The transceiver/handle housing is readily adapted for attachment to any PC, particularly pen based PCs. When thus attached, the handle provides a secure way for transporting and entering data into the PC. The handle also makes it possible for a user to engage the PC with the wall mount unit using one hand. Once in place, the PC is securely locked and can only be removed by entry of a select code into the PC. While in the wall mount, electrical connection is made between a battery recharger and the rechargeable battery, thus eliminating unsightly and potentially disruptive wires from a clinical setting. In addition, the PC can be inclined from the vertical storage position, facilitating convenient entry of data by a clinician.

What is claimed is:

1. A system for providing radio communication of data between a central processing computer and a remote user interface, the central processing computer residing at a central location and having a first transceiver electrically connected thereto, the system comprising:

a user interface remote from the central processing computer, the user interface including a first housing and means for input and output of data, the input and output means being mounted to the first housing to allow interaction by a user;

a second transceiver;

means for electronic communication between the user interface and the second transceiver;

a second housing defining a receptacle receiving the second transceiver;

the second housing comprising a rigid casing defining the user interface receiving receptacle, the rigid casing further including a top, a bottom, a front, and a back, there being a lengthwise slot in the front spaced from the top;

the second housing further including a handle having two spaced legs joined at their proximal ends by a transverse gripping bar, the distal ends of the spaced legs being pivotably attached to the rigid casing proximate the top of the rigid casing, the handle being configured to pivot onto the front of the rigid casing with the gripping bar received in the lengthwise slot in the front of the casing; and means for mounting the second housing to the first housing so that a user may grasp the second housing with one hand and access the input and output means with the other hand.

2. The system of claim 1 wherein the first housing includes a front and a back surface, and a top and a bottom, the input and output means being mounted to the front surface, and the second housing being mounted to the first housing with the back of the rigid casing abutting the back surface of the first housing proximate the top of the first housing.

3. A system for providing radio communication of data between a central processing computer and a remote user interface, the central processing computer residing at a central location and having a first transceiver electrically connected thereto, the system comprising:

a user interface remote from the central processing computer, the user interface including a first housing and means for input and output of data, the input and output means being mounted to the first housing to allow interaction by a user;

a second transceiver;

means for electronic communication between the user interface and the second transceiver;

a second housing defining a receptacle receiving the second transceiver, the housing being configured to be grasped by a single hand of a user;

means for mounting the second housing to the first housing so that a user may grasp the second housing with one hand and access the input and output means with the other hand; and a fixture attachment, the fixture attachment including means for attaching the fixture attachment to a fixture and means for releasably engaging the mounting means with the input and output means accessible by a user.

4. The system of claim 3 wherein the fixture attachment includes a base plate, means for attaching the base plate to a vertical surface, a carrier plate, and means between the carrier plate and the base plate for inclining the carrier plate relative to the base plate from a vertical storage position to an inclined position, the first housing resting upon the carrier plate with the releasably engaging means engaging the mounting means, so that with the carrier plate inclined access by a user to the input and output means of the user interface is facilitated.

5. The system of claim 4 wherein the inclining means comprises a first pair of spaced parallel legs each having first and second ends, each leg being pivotably attached at the first end to the carrier plate and at the second end to the base plate, and the second pair of parallel legs each having first and second ends, each leg being pivotably attached to the carrier plate and the base plate below the first pair of legs, the second pair of legs being longer than the first pair of legs.

6. The system of claim 4 further comprising a release bar pivotably mounted to the fixture attachment for pivotal movement between a first and a second position and release means connected between the release bar and the inclining means for enabling the inclining means to incline the carrier plate from the vertical storage position upon pivoting of the release bar from the first to the second positions.

7. The system of claim 4 wherein the mounting means comprises a spacing bracket attached between the first and second housings, the spacing bracket having a leading edge and the releasably engaging means comprises an engaging edge of the carrier plate, there being interlocking teeth between the leading edge of the spacing bracket and the engaging edge of the carrier plate, the user interface being attached to the carrier plate by sliding the spacing bracket teeth into engagement with the carrier plate teeth.

8. The system of claim 4 wherein the releasably engaging means includes a locking means on the carrier plate for securing a user interface on the carrier plate, the locking means being movable between a first position preventing disengagement of the user interface, and a second position for allowing disengagement of the user interface actuating means responsive to an electric signal for moving the locking means between the first and second positions, means for electrical communication between the actuating means and the user interface and means within the user interface for generating the electric signal causing the actuating means to move the locking means between the first and second positions upon entry by a user of a select code into the input output means of the user interface.

9. The system of claim 8 wherein the locking means comprises a latch pivotably attached to the carrier plate and movable between the first and second positions and a notch in the second housing, the latch engaging the notch in the first position and not engaging the notch when pivoted from the first position.

10. The system of claim 3 wherein user interface includes a rechargeable battery and the fixture attachment includes a battery recharger, there being means for electrical communication between the battery recharger and the rechargeable battery with the mounting means engaged by the releasably engaging means.

11. The system of claim 10 wherein means for electrical communication between the battery recharger and the rechargeable battery comprises a first plurality of electrical contacts on the second housing and a second plurality of electrical contacts on the carrier plate, the first and second pluralities of contacts abutting each other with the mounting means engaged by the releasably engaging means.

12. The system of claim 3 wherein the user interface is a personal computer and the means for electronic communication between the personal computer and the second transceiver comprises any standard off the shelf communications adapter.

13. The system of claim 12 wherein the user interface is a pen based personal computer.

14. A security device for releasably anchoring a personal computer to a fixture comprising:

a personal computer assembly including a personal computer and an attached handle housing;

a fixture attachment including means for attaching the fixture attachment to a fixture;

receiving means on the fixture attachment for captively receiving a portion of the personal computer assembly;

locking means on the fixture attachment having a first position for locking the portion of the personal computer assembly received within the receiving means so as to prevent removal of the personal computer assembly from the receiving means, and a second position for releasing the portion of the personal computer assembly to permit removal of the personal computer assembly from the receiving means;

actuating means operatively associated with the locking means for moving the locking means between the first and second positions in response to a select signal from the personal computer assembly received within the receiving means;

communication means between the actuating means and and the personal computer assembly received within the receiving means for conveying the select signal between the personal computer assembly and the actuating means; and the fixture attachment further comprising a base plate;

means for attaching the base plate to a vertical surface;

a carrier plate, the carrier plate including the receiving means; and means between the carrier plate and base plate for inclining the carrier plate relative to the base plate from a storage position with the carrier plate parallel to the base plate to an inclined position so as to facilitate easy access to the input and output means on the personal computer.

15. The security device of claim 14 wherein the inclining means comprises a first pair of parallel legs each having first and second ends, each leg being pivotably attached at the first end to the carrier plate and at the second end to the base plate, and the second pair of parallel legs each having first and second ends, each, end being pivotably attached to the carrier plate and the base plate below the first pair of legs and the second pair of legs being longer than the first pair of legs.

16. (amended) The security device of claim 14 wherein the fixture attachment further includes a battery recharger that may electrically communicate with a rechargeable battery of the personal computer.

17. The security device of claim 14 wherein the receiving means slidably receives the personal computer assembly and the locking means in the first position prevents sliding of the personal computer assembly received in the receiving means from the receiving means.

* * * * *